(12) United States Patent
Chen et al.

(10) Patent No.: US 7,546,447 B2
(45) Date of Patent: Jun. 9, 2009

(54) FIRMWARE INTERFACE RUNTIME ENVIRONMENT PROTECTION FIELD

(75) Inventors: Lechong Chen, Shanghai (CN); Bin Xing, Shanghai (CN); Feng Jin, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 425 days.

(21) Appl. No.: 10/581,155

(22) PCT Filed: May 8, 2004

(86) PCT No.: PCT/CN2004/000447

§ 371 (c)(1),
(2), (4) Date: May 31, 2006

(87) PCT Pub. No.: WO2005/109184

PCT Pub. Date: Nov. 17, 2005

(65) Prior Publication Data

US 2008/0288762 A1    Nov. 20, 2008

(51) Int. Cl.
*G06F 15/177* (2006.01)
*G06F 21/02* (2006.01)

(52) U.S. Cl. .............................. 713/1; 713/100; 726/2; 726/27

(58) Field of Classification Search ..................... 713/1, 713/2, 100; 726/2, 22–24, 26–27, 30
See application file for complete search history.

(56) References Cited

U.S. PATENT DOCUMENTS

| | | | |
|---|---|---|---|
| 6,185,678 B1 * | 2/2001 | Arbaugh et al. ................ 713/2 |
| 6,745,329 B1 | 6/2004 | Kao | |
| 2003/0028761 A1 * | 2/2003 | Platt .......................... 713/150 |
| 2004/0003288 A1 * | 1/2004 | Wiseman et al. ............ 713/201 |
| 2005/0149729 A1 * | 7/2005 | Zimmer et al. .............. 713/168 |

FOREIGN PATENT DOCUMENTS

| | | |
|---|---|---|
| EP | 0606771 A2 | 7/1994 |
| TW | 462025 | 1/2001 |

OTHER PUBLICATIONS

International Search Report PCT/CN2004/000447.

* cited by examiner

*Primary Examiner*—Dennis M Butler
(74) *Attorney, Agent, or Firm*—Blakely, Sokoloff, Taylor & Zafman LLP

(57) ABSTRACT

Method and apparatus for protecting a firmware runtime environment are described herein. In one embodiment, a process example is provided to retrieve a first key from a secure store of a firmware within a platform, the firmware including an initialization table for initializing the platform, and verify the initialization table using the first key retrieved from the secure store during an initialization of the platform. Other methods and apparatuses are also described.

19 Claims, 7 Drawing Sheets

FIRMWARE INTERFACE RUNTIME ENVIRONMENT PROTECTION FIELD

CROSS-REFERENCE TO RELATED APPLICATION

This application is a National Phase application of, and claims priority to, International Application No. PCT/CN2004/000447, filed May 8, 2004, entitled "FIRMWARE INTERFACE RUNTIME ENVIRONMENT PROTECTION FIELD"

Embodiments of the invention relate to firmware interfaces of a platform; and more specifically, to firmware interface runtime environment protection.

BACKGROUND

For EFI (extensible firmware interface) based BIOS (basic input/output system), there are some critical and valuable data structures and code that need to persist in a system memory at runtime, such as the S3 boot script table, EFI system table, EFI runtime services, etc. S3 resume functionality of EFI based BIOS is built upon the S3 boot script table. EFI runtime services will be used by an Operating System (OS). Without a protection mechanism, they are vulnerable to attack by the virus running at runtime. As such, the virus that has that EFI specific knowledge can take over control of the system by replacing the EFI S3 boot script or other runtime data, with its own rogue version. Executing this rogue routine will cause severe consequences, including critical end user data leakage.

FIG. 1 is a block diagram illustrating a typical configuration initialization of a platform (e.g., a data processing system). Referring to FIG. 1, in an EFI based environment, the platform is initialized in a phased fashion in the normal boot path 101. There are two phases for the platform initialization: Pre-EFI Initialization (PEI) 102, followed by Driver Execution Environment (DXE) 103. During the PEI phase 102, it initializes the minimum system resources to enable the DXE phase 103. During the DXE phase 103, numerous DXE drivers are executed collectively to initialize the platform into the final pre-boot state OS load 104. The majority of platform initialization is accomplished in the DXE phase 103 as it has much richer resources than the PEI phase 102.

In contrast, in S3 resume boot path 108, in order to achieve high-performance S3 restoration, a mechanism called EFI Boot Script is introduced to avoid executing the DXE phase 110 which is too complicated and time-consuming against the very strict requirement of S3 resume time. The process of the platform initialization can be viewed as a sequence of operations including accessing the I/O, memory, and PCI configuration space, and executing specific microprocessor instructions.

All of the above operations can be represented in EFI boot scripts. As such, the platform initialization can be performed by executing a sequence of EFI boot scripts of script table 107. During a normal boot path 101, the DXE drivers record their platform initialization operations as some boot scripts. Before booting the OS (block 104), all of these boot scripts are organized as a boot script table 107 and the boot script table 107 is copied into an Advanced Configuration and Power Interface (ACPI) Non-Volatile Storage (NVS) memory region 105 which will not be perturbed by the OS at runtime.

When the system wakes up and runs the S3 resume boot path 108, PEI module 109 of a boot script engine is able to execute all of the boot scripts in the boot script table 107 to restore (block 110) the configuration done in the previous DXE phase (e.g., block 103), instead of executing the DXE phase. This mechanism can expedite S3 resume. However, because this mechanism S3 resume highly relies on the boot script table 107 which is stored in the system memory and persists through runtime, the boot script table 107 is vulnerable to attack by viruses during runtime. One EFI boot script named dispatch boot script to perform the processor initialization. Dispatch boot script just records the entry point of a piece of arbitrary code. The action taken on execution of the dispatch boot script is just jumping to the entry point as used to execute the code (e.g., code 112). Code 112 will also be stored into ACPI NVS and persist through runtime. This code may be modified by malevolent code running at the runtime. Thus, by attacking the boot script table 107 and the code to be executed 112 during the execution of the boot scripts, viruses running in runtime environment can easily change S3 resume behavior, thereby taking over the control of the system.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
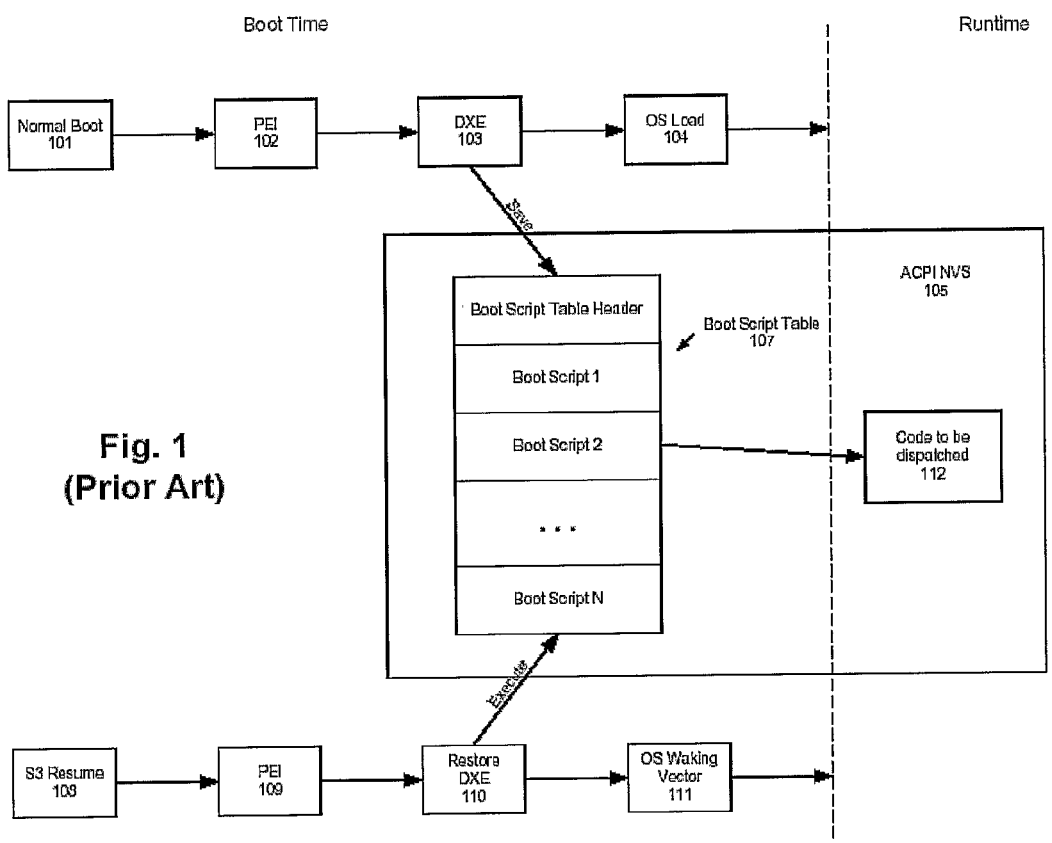
FIG. 1 is a block diagram illustrating a typical configuration initialization of a platform.

Method and apparatus for protecting a firmware runtime environment are described herein. In one embodiment, a variety of security techniques, such as, for example, digital signature or HMAC (HMAC: Keyed-Hashing for Message Authentication, RFC-2104), depending on what kind of secure store is available, are used to ensure the integrity of the critical runtime data structures and code for EFI based BIOS. In one embodiment, a secure store is implemented on the platform to protect keys, which are used to generate a signature or a HMAC, such that an attacker cannot forge a signature or a HMAC at runtime. In one embodiment, such a secure store may be implemented using a variety of techniques, such as, for example, SMRAM (system management RAM), secure flash, and/or TPM (trusted platform module), etc. In one embodiment, a signature (or HMAC) can be generated for both the boot script table and the code to be dispatched in a normal boot path, and then verified in an S3 resume boot path. As a result, any modifications to either the boot script table or the code to be dispatched by an attacker (or virus) can be detected.

In the following description, numerous specific details are set forth. However, it is understood that embodiments of the invention may be practiced without these specific details. In other instances, well-known circuits, structures and techniques have not been shown in detail in order not to obscure the understanding of this description.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

Embodiments of the present invention also relate to apparatuses for performing the operations described herein. An apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as Dynamic RAM (DRAM), erasable programmable ROMs (EPROMs), electrically erasable programmable ROMs (EEPROMs), magnetic or optical cards, or any type of media suitable for storing electronic instructions, and each of the above storage components is coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods. The structure for a variety of these systems will appear from the description below. In addition, embodiments of the present invention are not described with reference to any particular programming language. It will be appreciated that a variety of programming languages may be used to implement the teachings of the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 2:
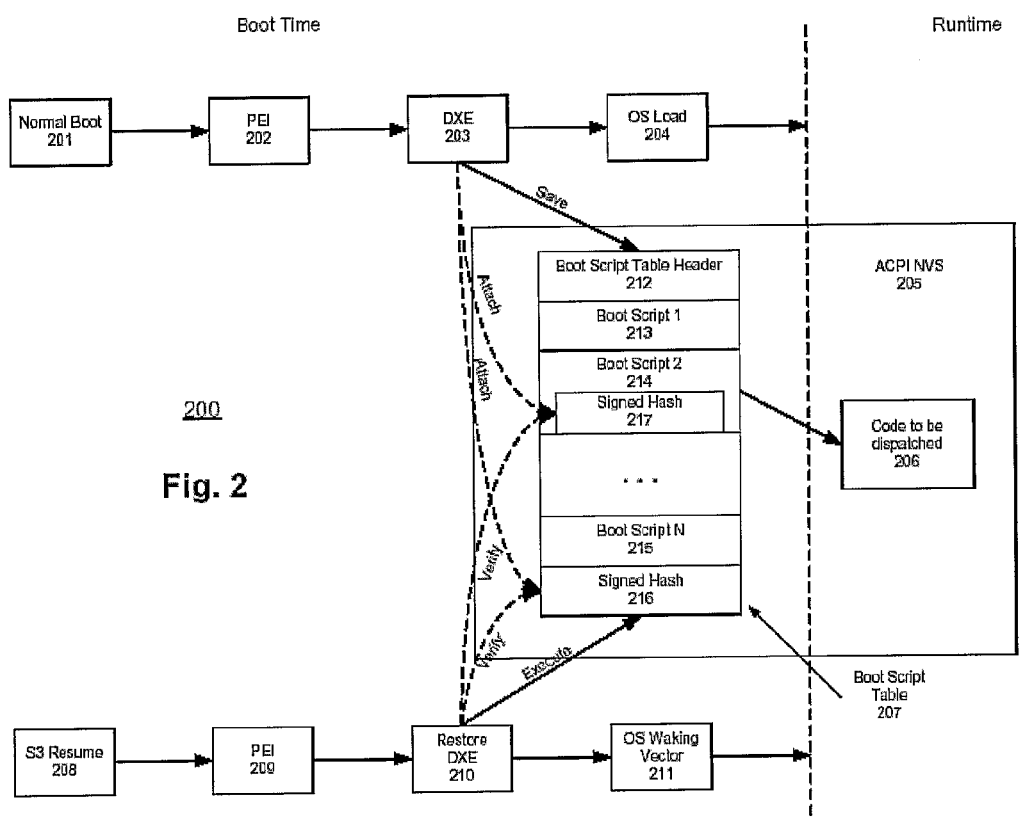
FIG. 2 is a block diagram illustrating an example of an EFI initialization of a platform according to one embodiment.

FIG. 2 is a block diagram illustrating an example of an EFI initialization of a platform according to one embodiment. A signature (also referred to as a signed hash) is generated for the boot script table and stored along with the table. A signature (e.g., signed hash) is also generated for each piece of code to be dispatched, and is stored along with the corresponding dispatch boot item in the table. When the platform resumes from S3, a PEI boot script engine invokes a verifier to verify the integrity of the boot script table before executing any boot scripts and verify the code to be dispatched before executing the code to be dispatched. If the verification fails at any time, the system will be reset to prevent it from executing any rogue code. As a result, the S3 resume boot path is secured for EFI based BIOS.

Referring to FIG. 2, similar to the configuration shown in FIG. 1, during a normal boot path 201, there is a PEI phase 202 and a DXE phase 203, prior to the OS load phase 204. During a resume path 208, there is also a PEI phase 209 and a DXE phase 210 before handing the control over to the waking vector phase 211. In one embodiment, during the normal boot path 201, a key is generated to sign the boot script table 207. The key generated may be a key pair, such as, for example, a RSA (Rivest, Shamir, and Adleman) key pair or a PGP (Pretty Good Privacy) key pair. Alternatively, the key may be a symmetrical key, such as, for example, an HMAC key. In one embodiment, the boot script table is hashed and signed using an asymmetric key.

In one embodiment, the keys generated may be stored in a secure store that can only be read or has no access at all after the boot time. In one embodiment, the secure store may be implemented as a store that satisfies one or more predetermined security requirements or policies. That is, during the boot time, the secure store may be read and written, during which the keys are generated and stored in the secure store. After the keys are stored in the secure store, the secure store may be locked to have either only read access or no access at all. The secure store can only be unlocked when the platform is reset. As a result, the keys are secured to deter virus attacks.

In one embodiment, the boot script table (also referred to as an initialization table) 207 includes a header 212 and one or more boot scripts (also referred to as initialization segments) 213-215. Some of the boot scripts may contain code that can be dispatched and executed during boot time. These boot scripts may be referred to as dispatch boot scripts that only contain an entry point (e.g., a pointer) to a piece of code to be dispatched. For example, boot script 214 includes code 206 to be dispatched at boot time. In one embodiment, some of the boot scripts are signed using a key generated above. In a particular embodiment, a boot script having code to be dispatched may require to be signed with a key. For example, boot script 214 having code 206 to be dispatched may be signed using a key and the resulting signature may be stored as signed hash 217 associated with boot script 214. In addition, the boot script table 207 may be signed using another key and the resulting signature may be stored as signed hash 216. It will be appreciated that the keys for signing the code to be dispatched and the key for signing the boot script table may or may not be the same key.

During the resume path 208, according to one embodiment, a boot script engine (e.g., boot script engine 301 of FIG. 3) handling the boot scripts may retrieve the keys from the secure store (e.g., secure store 303 of FIG. 3) and use the keys to verify the boot script table and the boot scripts whether the data integrity is still valid. For example, during the resume process, the boot script engine retrieves a key from the secure store to verify the signed hash 216 for the boot script table 207. In addition, the boot script engine may further retrieve another key or use the same key to verify the signed hash for the code associated with each of the dispatch boot scripts, such as signed hash 217 of boot script 214.

In one embodiment, the verification of the boot scripts may only be performed if the respective boot script contains code to be dispatched. Once the verification is performed successfully, according to one embodiment, the code associated with the boot script may be dispatched and executed. As a result, even if an attacker replaced the code to be dispatched, the verification would not be performed successfully, and the code would not be dispatched and executed. If the respective boot script does not contain code to be dispatched, according to one embodiment, the boot script will be executed without further verification.

Figure 3:
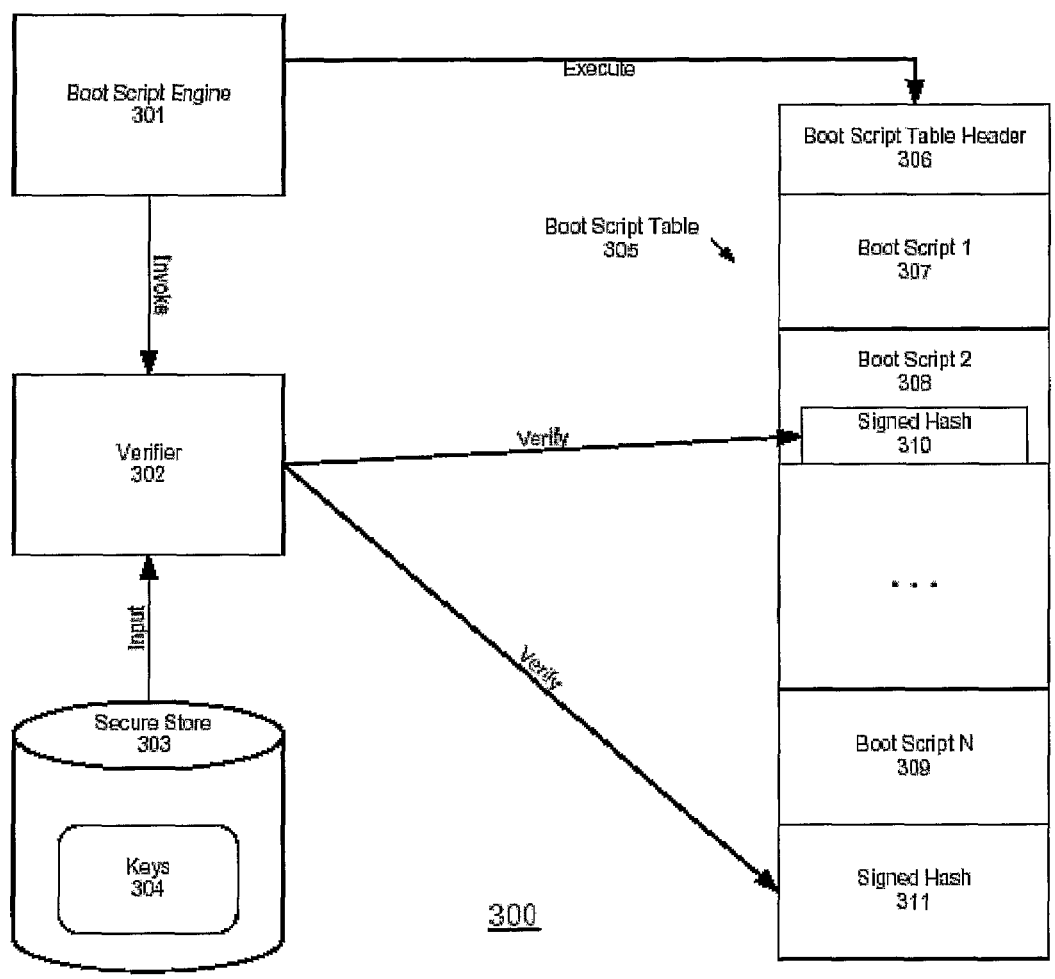
FIG. 3 is a block diagram illustrating an example of an initialization mechanism of a platform according to one embodiment.

FIG. 3 is a block diagram illustrating an example of an initialization mechanism of a platform according to one embodiment. The initialization mechanism example 300 may be implemented within a firmware of a platform (e.g., a data processing system or computer). For example, the initialization mechanism 300 may be implemented as a part of an EFI of a platform. In one embodiment, the initialization mechanism 300 includes, but is not limited to, an initialization engine to perform operations of an initialization table for initializing a platform, a secure store to store one or more keys for signing at least a portion of the initialization table, and a verifier coupled to the initialization engine and the secure store to verify at least a portion of the initialization table using at least one of the one or more keys during an initialization of the platform.

Referring to FIG. 3, the initialization mechanism 300 includes a boot script engine (also referred to as an initialization engine) 301, a verifier 302, a secure store 303, and a boot script table (also referred to as an initialization table) 305. In one embodiment, the boot script engine may be responsible for executing one or more boot scripts of the boot script table to perform the initialization operations. The verifier 302 is responsible for verifying at least a portion of the boot script table during an initialization phase, such as, for example, a boot resume phase, of a platform.

In one embodiment, the boot script table 305 includes, but is not limited to, a table header 306, one or more boot scripts (also referred to as initialization segments) 307-309. In one embodiment, at least a portion of the boot script table 305 may be signed (e.g., encrypted and/or hashed) using a key, which may be a part of keys 304 stored in the secure store 303. The signature or signatures of the boot script table may be stored as signed hash 311 associated with the boot script table 305. In one embodiment, one or more boor scripts may further be signed by a key, which may be a part of keys 304 stored in the secure store 303.

Some of the boot scripts, such as, boot script 308, of the boot script table 305 may contain code (e.g., code 206 of FIG. 2) that can be dispatched and executed. The boot script 308 may be a dispatch script containing only a reference to a dispatchable code. In one embodiment, only the boot script having the code to be dispatched may be signed with a key, either the same key or a different key. As a result, even if an attacker replaced the code to be dispatched, the replaced code would not be verified successfully by the verifier 302 and thus, the replaced code would be dispatched and/or executed. The above described security processes may be performed using a variety of security techniques. For example, the keys 304 may be key pairs, such as, for example, RSA or PGP key pairs. Alternatively, the keys 304 may be symmetrical keys.

The secure store 303 may be implemented using a variety of techniques, such as, for example, SMRAM (system management RAM), secure flash, and/or TPM (trusted platform module), etc. In one embodiment, the secure store 303 may be read-write on the initial power-on. The secure store 303 may be able to be locked so that it becomes read-only. The secure store may be unlocked only when the platform is reset.

Referring to FIG. 3, in one embodiment as an example, an RSA key pair is generated randomly in the normal boot path (e.g., normal boot path 201 of FIG. 2). Then the firmware (e.g., boot script engine 301) uses the generated private key of the key pair to sign the boot script table 305 and the code to be dispatched of boot script 308. Note that the boot script table and the code to be dispatched may be signed using the same key, or alternatively, using different keys. In a particular embodiment, the data structure of the code to be dispatched is hashed and signed using the private key. However, it is not necessary to follow those digital signature format specifications defined in PKCS #7 or any other standards. Other security techniques may be utilized.

Thereafter, according to one embodiment, the public key is stored in the secure store 303 as a part of keys 304 and the secure store is locked. Once the secure store is locked, the private key is destroyed before passing the control to the OS loader (e.g., OS loader 204 of FIG. 2). Since the public key is locked in the secure store and its corresponding private key is destroyed, an attacker cannot tamper with the public key, nor can the attacker tamper with the boot script table 305 and forge a signature (e.g., signed hash 311). Note that it is not necessary to use an RSA algorithm to generate signatures. Any other asymmetric signing algorithm could be used.

According to another embodiment, the secure store 303 may be read-write on the initial power-on. The secure store 303 may be able to be locked so that no access from outside of the secure store is available while it is locked. The secure store may be unlocked only when the platform is reset.

In this embodiment, a symmetric key is generated randomly during the normal boot path (e.g., normal boot path 201 of FIG. 2). The firmware uses the symmetric key to calculate a HMAC for the boot script table 305 (or to encrypt the data structure if the privacy is desired) and the code to be dispatched (e.g., code 206). Thereafter, the symmetric key is stored as a part of keys 304 in the secure store 303 before passing control to the OS loader (e.g., OS loader 204 of FIG. 2). As a result, an attacker cannot forge an HMAC even if he has tampered with either the boot script table 305 or the code to be dispatched since the key is locked in the secure store 303 and thereby cannot be accessed. In one embodiment, the secure store that allows an execution of code therein, such as SM Ram, may also expose an interface for HMAC verification at runtime.

In this embodiment, an assumption is made, that the code that verifies the signatures (e.g., the verifier 302) is intact. In one embodiment, the firmware hub can be locked so that the flash can be treated as a read-only storage. When the platform resumes from S3, the code in the boot block of the flash will be executed at the very beginning. The boot block is responsible to make sure that the verifier 302 will be intact and behave as expected. In one embodiment, the verifier 302 may be loaded first from the flash, which can be treated read-only on most platforms.

It will be appreciated that the signatures are not necessary to be stored next to the corresponding boot script. In fact, the signature could be stored anywhere, as long as the verifier 302 can find them when needed. In addition, the processes are similar if HMAC is used instead of RSA key pairs, except that HMAC requires the secure store 303 to be inaccessible by the code outside the secure store when the secure store is locked, in which case, the verifier 302 may also be located in the secure store and expose interfaces for HMAC verification. Other configurations and/or implementations may be utilized.

Figure 4:
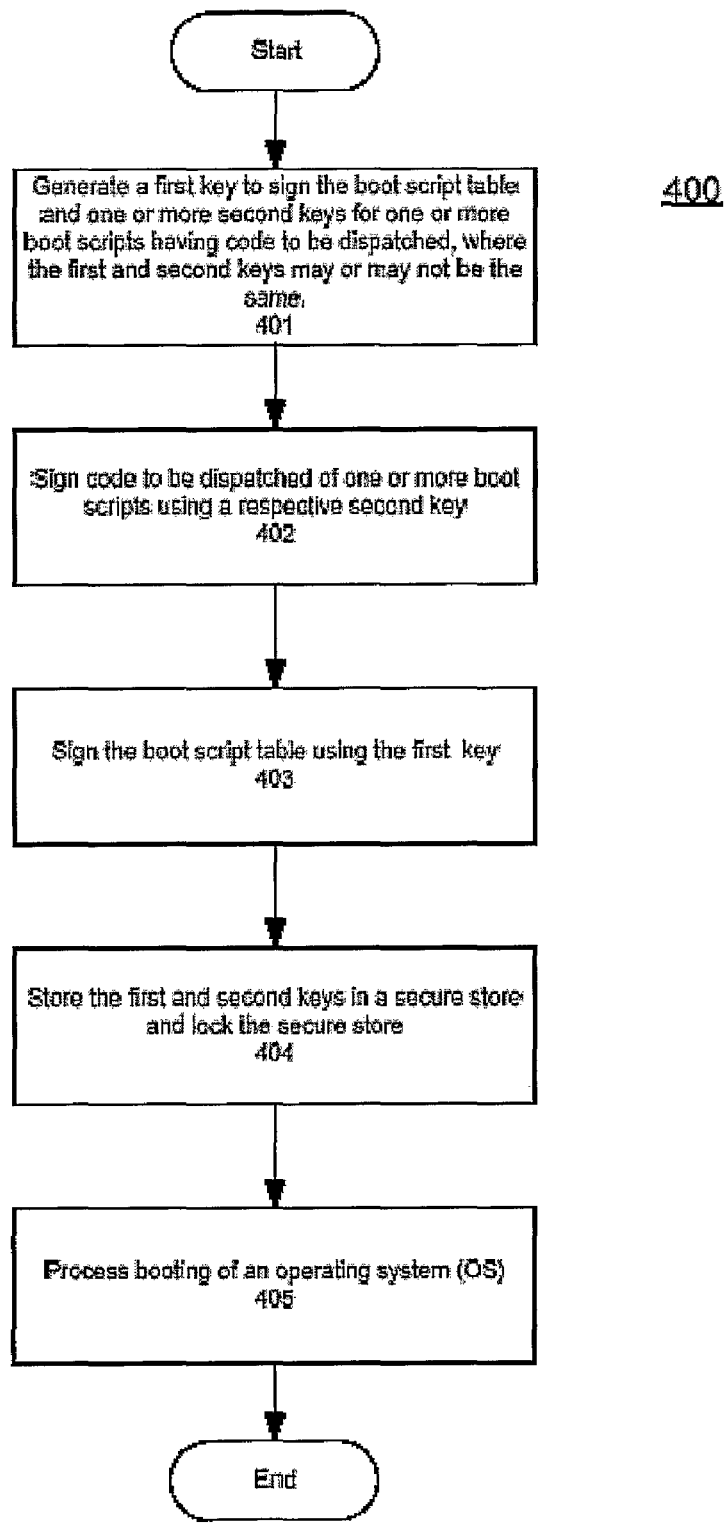
FIG. 4 is a flow diagram illustrating a process example for initializing a platform according to one embodiment.

FIG. 4 is a flow diagram illustrating a process example for initializing a platform according to one embodiment. Process example 400 may be performed by a processing logic that may comprise hardware (circuitry, dedicated logic, etc.), software (such as is run on a dedicated machine), or a combination of both. For example, the process example 400 may be performed during a normal boot path, such as, normal boot path 201 of FIG. 2. In one embodiment, process example 400 includes, but not limited to, generating a first key to sign an initialization table (e.g., boot script table) of a firmware in a platform, the initialization table being used to initialize the platform, signing the initialization table using the first key, storing the first key in a secure store that satisfies one or more security requirements or policies, and locking the secure store after the first key is stored in the secure store.

Referring to FIG. 4, at block 401, a first key is generated to sign (e.g., encrypt and/or hash) a boot script table, such as, boot script table 305 of FIG. 3, and one or more second keys are generated to sign (e.g., encrypt and/or hash) the dispatchable code of one or more boot scripts (e.g., boot script 308 of FIG. 3). In one embodiment, the second keys are generated only for the code to be dispatched. The one or more second keys may be generated specifically for each boot script. Alternatively, the same second key may be used to sign all of the boot scripts having code to be dispatched. Furthermore, the first and second keys may be the same key.

At block 402, the dispatchable code of one or more boot scripts are signed with the one or more second keys and at block 403, the boot script table is signed with the first key. At block 404, the first and second keys are stored in a secure store, such as secure store 303 of FIG. 3 and thereafter, at block 405, the control may be passed over to the OS loader.

According to one embodiment, the first and second keys may be generated as key pairs, such as, RSA and/or PGP key pairs. Alternatively, the first and second keys may be generated as symmetric keys. When the key pairs are used, in one embodiment, the secure store may be accessed as read/write during initial power-on processes, locked as read-only after the first and second keys are stored therein, and unlocked only when the platform is reset. When the symmetric keys are used, according to another embodiment, the secure store may be accessed as read/write during initial power-on processes, locked without any access from outside of the secure store after the first and second keys are stored therein, and unlock only when the platform is reset. Other configurations may exist.

Figure 5:
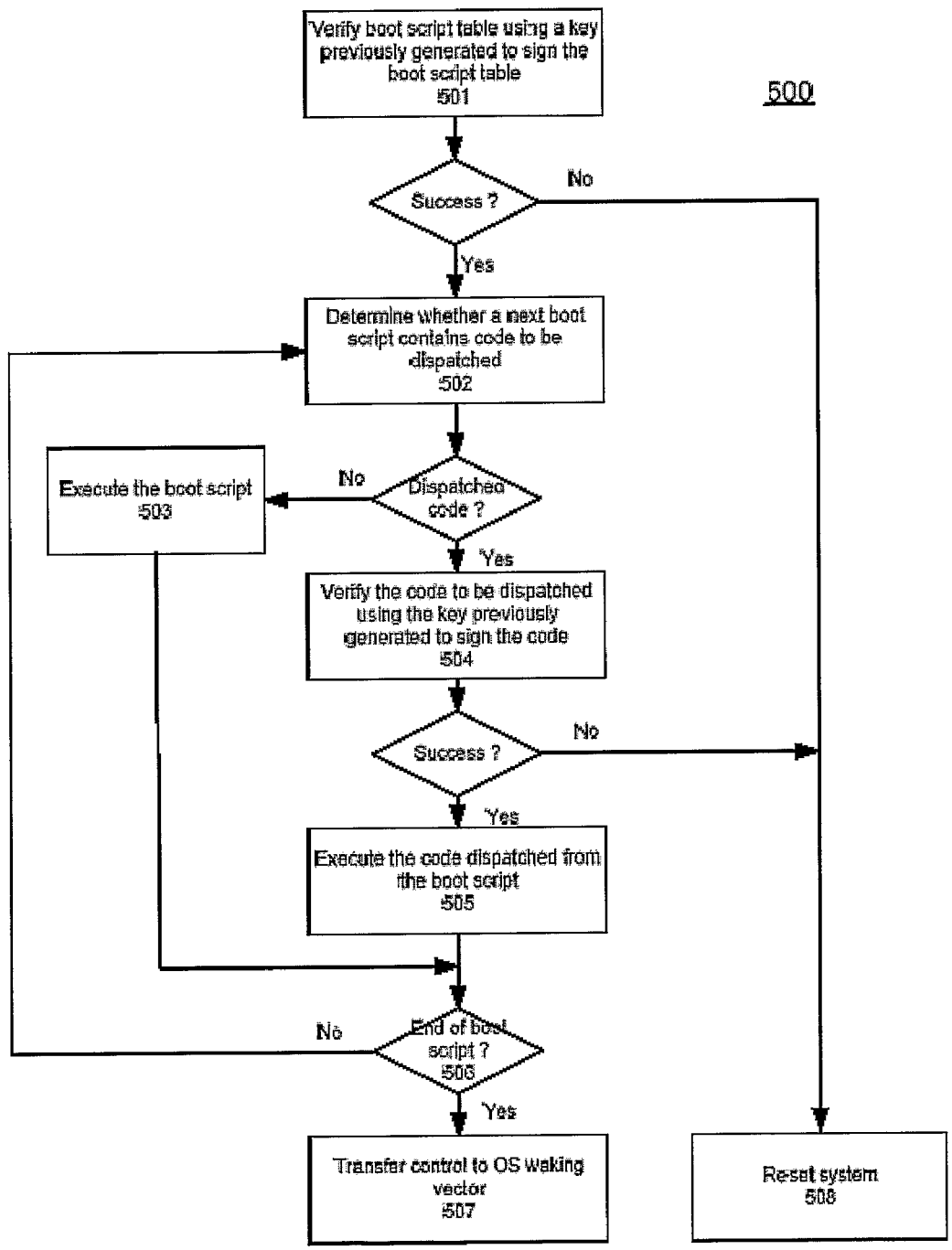
FIG. 5 is a flow diagram illustrating a process example for initializing a platform according to one embodiment.

FIG. 5 is a flow diagram illustrating a process example for initializing a platform according to one embodiment. Process example 500 may be performed by a processing logic that may comprise hardware (circuitry, dedicated logic, etc.), software (such as is run on a dedicated machine), or a combination of both. For example, the process example 500 may be performed during a resume boot path, such as, resume boot path 208 of FIG. 2. In one embodiment, process example 500 includes, but not is limited to, retrieving a first key from a secure store within a platform, the firmware including an initialization table for initializing the platform, and verifying the initialization table using the first key retrieved from the secure store during an initialization of the platform.

Referring to FIG. 5, during an initialization of a platform, such as a resume boot process, at block 501, a first key is retrieved from a secure store, such as secure store 303 of FIG. 3. The boot script table, such as boot script table 305 is verified using the first key. The boot script table is signed (e.g., encrypted and/or hashed) previously using the first key during a previous initialization of the platform, such as a normal boot process. If the verification is performed unsuccessfully, at block 508, the platform is reset.

If the verification is performed successfully, at block 502, it is determined whether a boot script of the boot script table contains code that can be dispatched. If the respective boot script does not contain the code to be dispatched (e.g., boot script 307 of FIG. 3), at block 503, the boot script is executed without further verification and a next boot script is processed.

If the respective boot script contains the code to be dispatched (e.g., boot script 308), at block 504, a second key is retrieved from the secure store and the code to be dispatched is verified using the second key. The code of the respective boot script is signed (e.g., encrypted and/or hashed) previously using the second key during a previous initialization of the platform, such as a normal boot process. If the verification of the boot script is performed unsuccessfully, at block 508, the platform is reset.

If the verification of the boot script is performed successfully, at block 505, the code to be dispatched corresponding to the boot script is executed. The above processes are repeated until all of the boot scripts of the boot script table have been processed (block 506). Thereafter, at block 507, the control is transferred to the OS waking vector. Other operations may also be performed.

According to one embodiment, the first and second keys may be generated as key pairs, such as, RSA and/or PGP key pairs. Alternatively, the first and second keys may be generated as symmetric keys. When the key pairs are used, in one embodiment, the secure store may be accessed as read/write during initial power-on processes, locked as read-only after the first and second keys are stored therein, and unlock only when the platform is reset. When the symmetric keys are used, according to another embodiment, the secure store may be accessed as read/write during initial power-on processes, locked without any access from outside of the secure store after the first and second keys are stored therein, and unlocked only when the platform is reset. Other configurations may exist.

Figure 6:
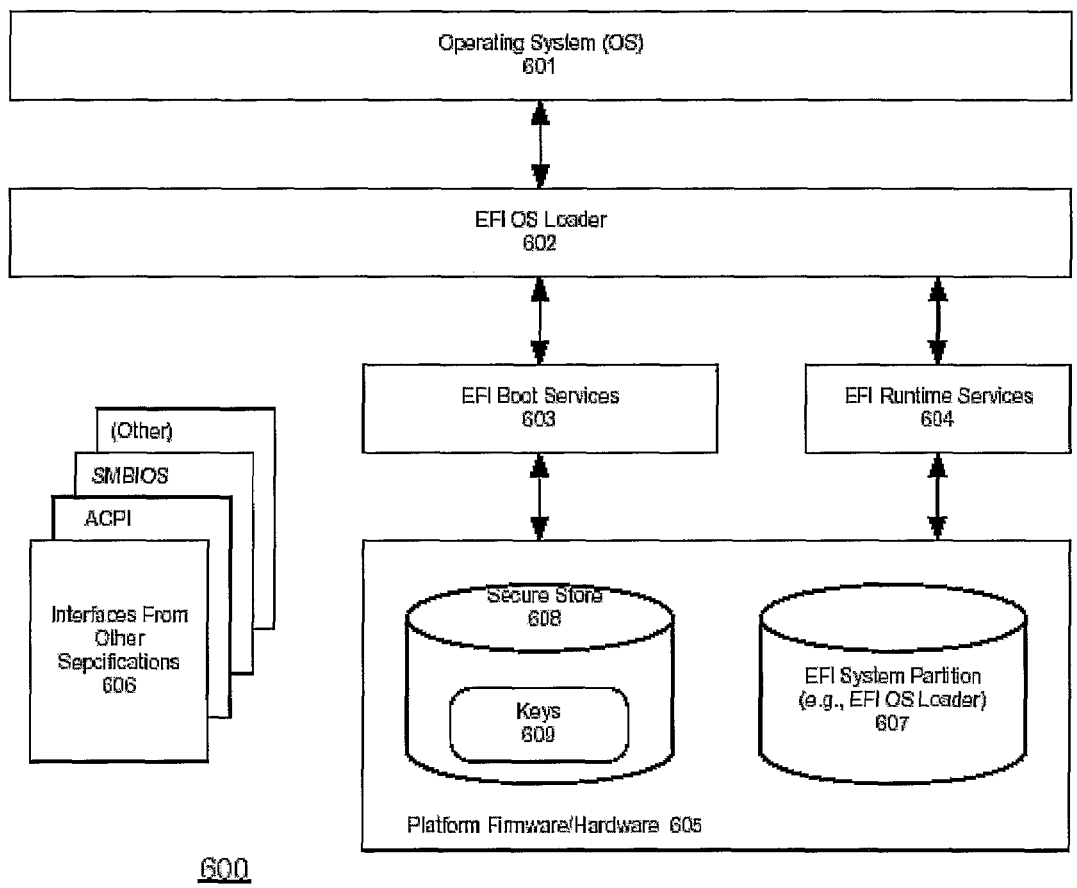
FIG. 6 is a block diagram illustrating an EFI architecture example that may be used with an embodiment of the invention.

FIG. 6 is a block diagram illustrating an EFI architecture example that may be used with an embodiment of the invention. Referring to FIG. 6, in one embodiment, the architecture example 600 includes, but is not limited to, an operating system (OS) 601, an EFI OS loader 602, EFI boot services 603, EFI runtime services 604, platform hardware/firmware 605, and interfaces for other specifications or standards 606.

OS 601 may be an operating system from a variety of vendors, such as, for example, a Windows operating system from Microsoft or a Mac OS from Apple Computer. Alternatively, the OS 601 may be UNIX or Linux operating system. Other operating systems, such as, for example, embedded operating systems or real-time operating systems may be utilized. OS loader 602 is responsible for loading OS 601.

EFI boot services 603 provide interfaces for devices and system functionality that can be used during boot time. Device access is abstracted through "handles" and "protocols." This facilitates reuse of investments out of the specification without burdening the consumer accessing the device. EFI runtime services 604 are used to ensure appropriate abstraction of base platform hardware resources that may be needed by the OS during the normal operations.

In one embodiment, platform firmware/hardware 605 includes, but is not limited to, an EFI system partition that may include an EFI OS loader. The system partition defines a partition and file system that are designed to allow safe sharing between multiple vendors, and for different purposes. The ability to include a separate sharable system partition presents an opportunity to increase platform value-add without significantly growing the need for non-volatile platform memory.

The platform firmware is able to retrieve the OS loader image from the EFI system partition 607. The specification provides for a variety of mass storage device types including disk, CD-ROM, and DVD, as well as remote boot via a network. Through the extensible protocol interfaces, it is possible to envision other boot media types being added, although these may require OS loaded modifications if they require use of specific protocols other than those standardized.

Once started, the OS loader 602 continues to boot the complete operating system 601. To do so, it may use the EFI boot services 603 to survey, comprehend, and initialize the various platform components and the OS software that manages them. EFI runtime services 604 may also be available to the OS loader 602 during the boot phase.

In addition, the platform firmware/hardware 605 includes a secure store 608, where one or more keys 609 may be stored. The keys 609 may include the keys to sign a boot script table (e.g., boot script table 305 of FIG. 3) and dispatchable code of one or more boot scripts (e.g., boot scripts 307-309 of FIG. 3). The keys 609 may be generated during a normal boot path (e.g., normal boot path 201 of FIG. 2) and used to verify the boot script table and one or more boot scripts during a resume boot path (e.g., resume boot path 208 of FIG. 2). The secure store 608 may be implemented using a variety of techniques, such as, for example, SMRAM (system management RAM), secure flash, and/or TPM (trusted platform module), etc. Note that the secure store 608 may not necessarily within the platform firmware 605. It will be appreciated that the secure store 608 may be implemented anywhere within the platform as long as the secure store 608 can be accessed by the firmware and satisfies a set of security policies.

According to one embodiment, the keys 609 may be generated as key pairs, such as, RSA and/or PGP key pairs. Alternatively, the keys 609 may be generated as symmetric keys. When the key pairs are used, in one embodiment, the secure store 608 may be accessed as read/write during initial power-on processes, locked as read-only after the keys 608 are stored therein, and unlocked only when the platform is reset. When the symmetric keys are used, according to another embodiment, the secure store 608 may be accessed as read/write during initial power-on processes, locked without any access from outside of the secure store after the keys 609 are stored therein, and unlocked only when the platform is reset. Other configurations may exist.

Figure 7:
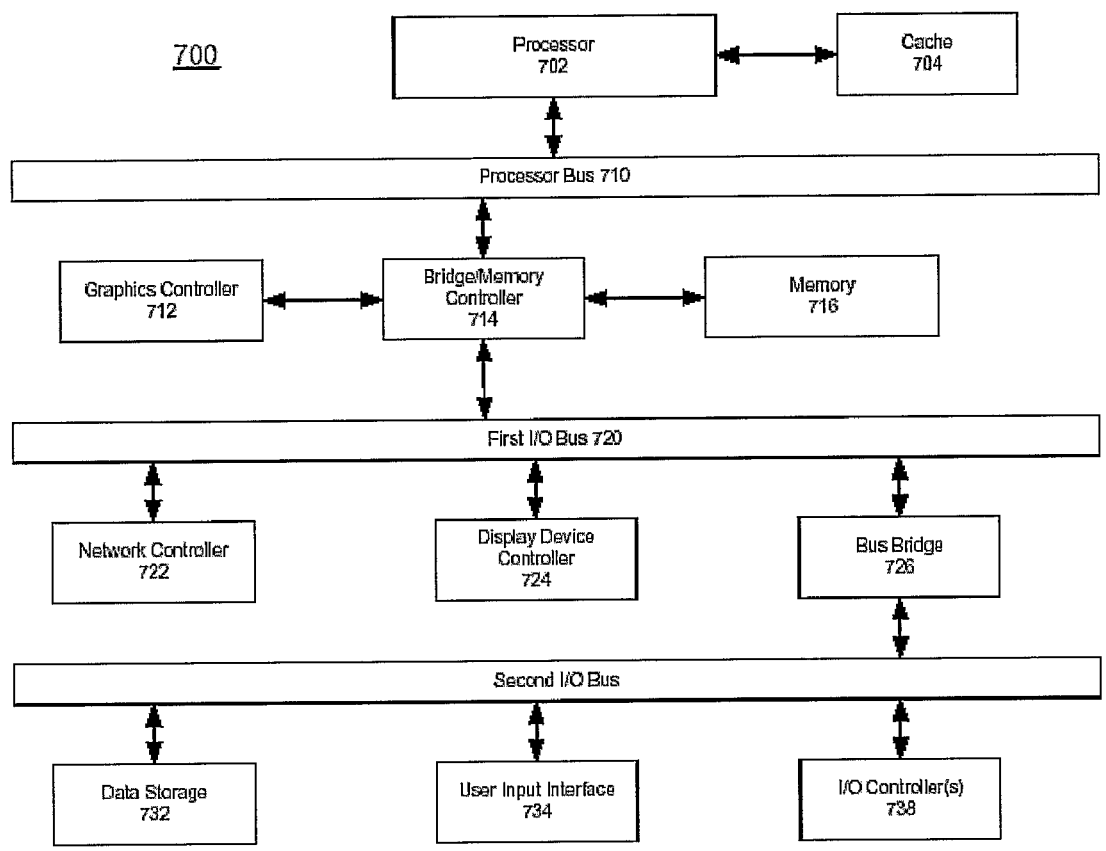
FIG. 7 is a block diagram illustrating an example of a data processing system according to one embodiment of the present invention.

FIG. 7 is a block diagram illustrating an example of a data processing system according to one embodiment of the present invention. The exemplary system 700 may be used to perform the process examples described above to protect runtime environments. Note that while FIG. 7 illustrates various components of a computer system, it is not intended to represent any particular architecture or manner of interconnecting the components, as such details are not germane to the present invention. It will also be appreciated that network computers, handheld computers, cell phones, and other data processing systems, which have fewer components or perhaps more components, may also be used with the present invention. The computer system of FIG. 7 may, for example, be an Apple Macintosh computer or an IBM compatible PC.

Referring to FIG. 7, the computer system 700 includes, but not limited to, a processor 702 that processes data signals. The processor 702 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 7 shows an example of an embodiment of the invention implemented as a single processor system 700. However, it is understood that embodiments of the present invention may alternatively be implemented as systems having multiple processors. Processor 700 may be coupled to a processor bus 710 that transmits data signals between processor 702 and other components in the system 700.

In addition, system 700 includes a memory 716. Memory 716 may be a dynamic random access memory (DRAM) device, a static random access memory (SRAM) device, or other memory device. Memory 716 may also contain additional software and/or data not shown. A cache memory 704 may reside inside or outside the processor 702 that stores data signals stored in memory 716. Cache memory 704 in this embodiment speeds up memory accesses by the processor by taking advantage of its locality of access.

Further, a bridge/memory controller 714 may be coupled to the processor bus 710 and memory 716. The bridge/memory controller 714 directs data signals between processor 702, memory 716, and other components in the system 700 and bridges the data signals between processor bus 710, memory 716, and a first input/output (I/O) bus 720. In some embodiments, the bridge/memory controller provides a graphics port for coupling to a graphics controller 712. In this embodiment, graphics controller 712 interfaces to a display device for displaying images rendered or otherwise processed by the graphics controller 712 to a user. The display device may include a television set, a computer monitor, a flat panel display, or other suitable display devices.

First I/O bus 720 may include a single bus or a combination of multiple buses. First I/O bus 720 provides communication links between components in system 700. A network controller 722 may be coupled to the first I/O bus 720. The network controller links system 700 to a network that may include a plurality of processing system and supports communication among various systems. The network of processing systems may include a local area network (LAN), a wide area network (WAN), the Internet, or other network.

In some embodiments, a display device controller 724 may be coupled to the first I/O bus 720. The display device controller 724 allows coupling of a display device to system 700 and acts as an interface between a display device and the system. The display device may comprise a television set, a computer monitor, a flat panel display, or other suitable display device. The display device receives data signals from processor 702 through display device controller 724 and displays information contained in the data signals to a user of system 700.

A second I/O bus 730 may comprise a single bus or a combination of multiple buses. The second I/O bus 730 provides communication links between components in system 700. A data storage device 732 may be coupled to second I/O bus 730. The data storage device 732 may include a hard disk drive, a floppy disk drive, a CD-ROM device, a flash memory device, or other mass storage devices. Data storage device 732 may include one or a plurality of the described data storage devices.

A user input interface 734 may be coupled to the second I/O bus 730, such as, for example, a keyboard or a pointing device (e.g., a mouse). The user input interface 734 may include a keyboard controller or other keyboard interface device. The user input interface 734 may include a dedicated device or may reside in another device such as a bus controller or other controller device. The user input interface 734 allows coupling of a user input device (e.g., a keyboard, a mouse, joystick, or trackball, etc.) to system 700 and transmits data signals from a user input device to system 700.

One or more I/O controllers 738 may be used to connect one or more I/O devices to the exemplary system 700. For example, the I/O controller 738 may include a USB (universal serial bus) adapter for controlling USB peripherals or alternatively, an IEEE 1394 (also referred to as Firewire) bus controller for controlling IEEE 1394 compatible devices.

Furthermore, the elements of system 700 perform their conventional functions well-known in the art. In particular, data storage device 732 may be used to provide long-term storage for the executable instructions and data structures for embodiments of methods of dynamic loop aggregation in accordance with embodiments of the present invention, whereas memory 716 is used to store on a shorter term basis the executable instructions of embodiments of the methods of dynamic loop aggregation in accordance with embodiments of the present invention during execution by processor 702.

Although the above example describes the distribution of computer code via a data storage device, program code may be distributed by way of other computer readable mediums. For instance, a computer program may be distributed through a computer readable medium such as a floppy disk, a CD ROM, a carrier wave, a network, or even a transmission over the Internet. Software code compilers often use optimizations during the code compilation process in an attempt to generate faster and better code.

Thus, method and apparatus for protecting a firmware runtime environment have been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
    retrieving a first key from a secure store associated with a firmware within a platform, the firmware including an initialization table for initializing the platform, wherein the initialization table comprises one or more initialization segments that are individually executable;
    verifying the initialization table using the first key retrieved from the secure store during an initialization of the platform;
    retrieving a second key from the secure store; and
    verifying at least one initialization segment using the second key retrieved from the secure store.

2. The method of claim 1, wherein the at least one initialization segment is signed using the second key prior to being stored in the firmware.

3. The method of claim 1, further comprising examining the at least one initialization segment to determine whether the at least one initialization segment includes code to be dispatched, wherein the verification is performed only if the at least one initialization segment includes the code to be dispatched.

4. The method of claim 3, further comprising:
    determining whether the verification of the at least one initialization segment is performed successfully; and
    executing the code dispatched from the at least one initialization segment if the verification of the at least one initialization segment is performed successfully.

5. The method of claim 4, further comprising resetting the platform if the verification is performed unsuccessfully.

6. The method of claim 1, further comprising executing the at least one initialization segment without performing the verification, if the at least one initialization segment does not include the code to be dispatched.

7. The method of claim 1, wherein the initialization of the platform is performed during a resume process of the platform, and wherein the first and second keys are generated, and the initialization table and the at least one initialization segment are signed during a boot process of the platform.

8. A machine-readable storage medium having executable code to cause a machine to perform a method, the method comprising:
    retrieving a first key from a secure store of a firmware within a platform, the firmware including an initialization table for initializing the platform, wherein the initialization table comprises one or more initialization segments that are individually executable;
    verifying the initialization table using the first key retrieved from the secure store during an initialization of the platform;
    retrieving a second key from the secure store; and
    verifying at least one initialization segment using the second key retrieved from the secure store.

9. The machine-readable storage medium of claim 8, wherein the method further comprises examining the at least one initialization segment to determine whether the at least one initialization segment includes code to be dispatched, wherein the verification is performed only if the at least one initialization segment includes the code to be dispatched.

10. The machine-readable storage medium of claim 9, further comprising:
    determining whether the verification is performed successfully; and
    executing the code dispatched from the at least one initialization segment if the verification is performed successfully.

11. A data processing system, comprising:
    a processor;
    a memory coupled to the processor storing an initialization table and a process, the memory including a secure store; and
    the process, when executed from the memory, causes the processor to retrieve a first key from the secure store,
        verify the initialization table using the first key retrieved from the secure store during an initialization of the data processing system, wherein the initialization table comprises one or more initialization segments that are individually executable,
        retrieve a second key from the secure store, and
        verify at least one initialization segment using the second key retrieved from the secure store.

12. The data processing system of claim 11, wherein the process further causes the processor to examine the at least one initialization segment to determine whether the at least one initialization segment includes code to be dispatched, wherein the verification is performed only if the at least one initialization segment includes the code to be dispatched.

13. A computer-implemented method, comprising:
    generating a first key to sign an initialization table of a firmware in a platform, the initialization table being used to initialize the platform, wherein the initialization table comprises one or more initialization segments that are individually executable;

signing the initialization table using the first key;

storing the first key in a secure store of the firmware;

generating a second key;

signing at least one initialization segment of the initialization table using the second key;

storing the second key in the secure store; and locking the secure store after the first key and the second key are stored in the secure store.

14. The method of claim 13, further comprising examining the at least one initialization segment to determine whether the at least one initialization segment includes code to be dispatched, wherein the signing operations using the second key is performed only if the at least one initialization segment includes the code to be dispatched.

15. The method of claim 13, wherein the first and second keys are generated, and the initialization table and the at least one initialization segment are signed during a boot process of the platform.

16. A machine-readable storage medium having executable code to cause a machine to perform a method, the method comprising:

generating a first key to sign an initialization table of a firmware in a platform, the initialization table being used to initialize the platform. wherein the initialization table comprises one or more initialization segments that are individually executable;

signing the initialization table using the first key;

storing the first key in a secure store of the firmware;

generating a second key;

signing at least one initialization segment of the initialization table using the second key;

storing the second key in the secure store: and locking the secure store after the first key and the second key are stored in the secure store.

17. The machine-readable storage medium of claim 16, wherein the method further comprises examining the at least one initialization segment to determine whether the at least one initialization segment includes code to be dispatched, wherein the signing operation using the second key is performed only if the at least one initialization segment includes the code to be dispatched.

18. A data processing system, comprising:

a processor;

a memory coupled to the processor storing an initialization table and a process, the memory including a secure store; and the process, when executed from the memory, causes the processor to generate a first key to sign the initialization table, wherein the initialization table comprises one or more initialization segments that are individually executable, sign the initialization table using the first key, store the first key in the secure store, generate a second key, sign at least one initialization segment of the initialization table using the second key, store the second key in the secure store, and lock the secure store after the first key and the second key are stored in the secure store.

19. The data processing system of claim 18, wherein the process further causes the processor to examine the at least one initialization segment to determine whether the at least one initialization segment includes code to be dispatched, wherein the signing operation using the second key is performed only if the at least one initialization segment includes the code to be dispatched.

* * * * *